United States Patent [19]

Lai

[11] 3,801,834

[45] Apr. 2, 1974

[54] ANALOG TO PULSE WIDTH CONVERTER

[75] Inventor: Chi Sun Lai, Lake Zurich, Ill.

[73] Assignee: Motorola Inc., Franklin Park, Ill.

[22] Filed: Oct. 26, 1972

[21] Appl. No.: 300,955

[52] U.S. Cl. ........... 307/265, 307/273, 340/347 AD

[51] Int. Cl. .............................................. H03k 5/04

[58] Field of Search ...... 307/229, 265, 273; 328/58, 328/207; 340/347 AD

[56] References Cited

UNITED STATES PATENTS

| | | | |
|---|---|---|---|
| 3,711,729 | 1/1973 | Quiogue | 307/273 |
| 3,436,682 | 4/1969 | Birnbaum | 307/273 |
| 3,732,506 | 5/1973 | Dupuy | 307/265 |
| 3,705,991 | 12/1972 | Hobo | 307/265 |
| 3,402,368 | 9/1968 | Belcastro et al. | 307/265 |
| 3,651,345 | 3/1972 | Lundgreen | 307/265 |

*Primary Examiner*—Stanley D. Miller, Jr.
*Attorney, Agent, or Firm*—Ronald J. LaPorte; Vincent J. Rauner

[57] ABSTRACT

An analog to pulse width converter circuit includes a monostable multivibrator. The circuit is maintained in a first stable state by a constant current source. An analog voltage representing, for example, the oil pressure of an internal combustion engine is applied at the input of the circuit to charge the capacitor of the multivibrator to the voltage level of the analog voltage. A sample oscillator applying pulses periodically to the circuit triggers the latter to operation in a second, active state, whereby an output is provided from the circuit. Upon operation to the active state, the constant current source charges the capacitor in the opposite direction; the reverse charging time being determined by the original charge on the capacitor at the time of application of the trigger pulse. The duration of the circuit output is thus equal to the reverse charging time and directly related to the voltage level of the analog voltage. Additional circuitry including a clock oscillator, AND gate and pulse converter may be employed in conjunction with the analog to pulse width converter circuit to provide an analog to digital converter.

5 Claims, 2 Drawing Figures

ANALOG TO PULSE WIDTH CONVERTER

BACKGROUND

This invention relates generally to analog to pulse width converter circuits and more particularly to such circuitry which may be used in analog to digital converter apparatus.

Multivibrator circuits used for pulse width modulation including a capacitor which is charged and discharged to control the operation of the circuit, are common. In such circuits, the current for charging the capacitor is often supplied by a source controlled by a reference power supply voltage and conventionally the discharge time of the capacitor is controlled by a resistor or the like element coupled to the power supply to determine one portion of the cycle time of the circuit.

In the latter type of arrangement, because of the possible instability of the power supply, both the charging and discharging time of the capacitor may vary since they are both dependent on the power supply output. Thus, such a circuit does not lend itself to use in analog to digital converter circuitry which may be used to monitor the level or value of a particular quantity such as, for example, oil pressure or the like in a motor vehicle, wherein it is essential that a pulse width derived from the circuit not be affected by the instability of a power supply.

SUMMARY

Accordingly, it is a primary object of the present invention to provide a new and improved analog to pulse width converter circuit which is independent of power supply voltage variations.

It is another object of the invention to provide a circuit of the above described type which has high stability and is a relatively simple, low cost circuit.

It is still another object of the present invention to provide a new and improved analog to digital circuit using an analog to pulse width converter according to the invention.

Briefly, a preferred embodiment of the analog to pulse width converter circuit according to the invention includes a monostable multivibrator having first and second transistors and a capacitor connected between the collector of the first transistor and base of the second in the conventional manner. A constant current source powered by a conventional power supply is connected to the base or input of the second transistor and an analog input voltage is supplied directly to the input of the circuit to charge the capacitor to that voltage in a first polarity. A sample oscillator coupled to the base of the first transistor turns the latter on upon the provision of a trigger pulse thereto. The sample oscillator provides trigger pulses at time intervals greater than the maximum expected pulse duration of an output pulse of the circuit plus the capacitor charging time, to insure correct operation of the circuit. The trigger pulses turn off the second transistor. The circuit remains in this state until the constant current source charges the capacitor in the opposite direction. The output pulse of the circuit is provided by the power supply voltage and the duration or pulse width thereof is determined by the time it takes to charge the capacitor by the constant current source in an opposite polarity from the original charge thereon which was determined by the level of the analog input voltage initially applied thereto.

The pulse width converter can be combined with a clock oscillator which provides a predetermined number of pulses over a fixed time period to produce a digital output. The latter can be used to indicate a measure of the input voltage representative of the value or level at a given time of a variable quantity, such as the pressure of the oil, etc., in a motor vehicle system.

DETAILED DESCRIPTION

Figure 1:
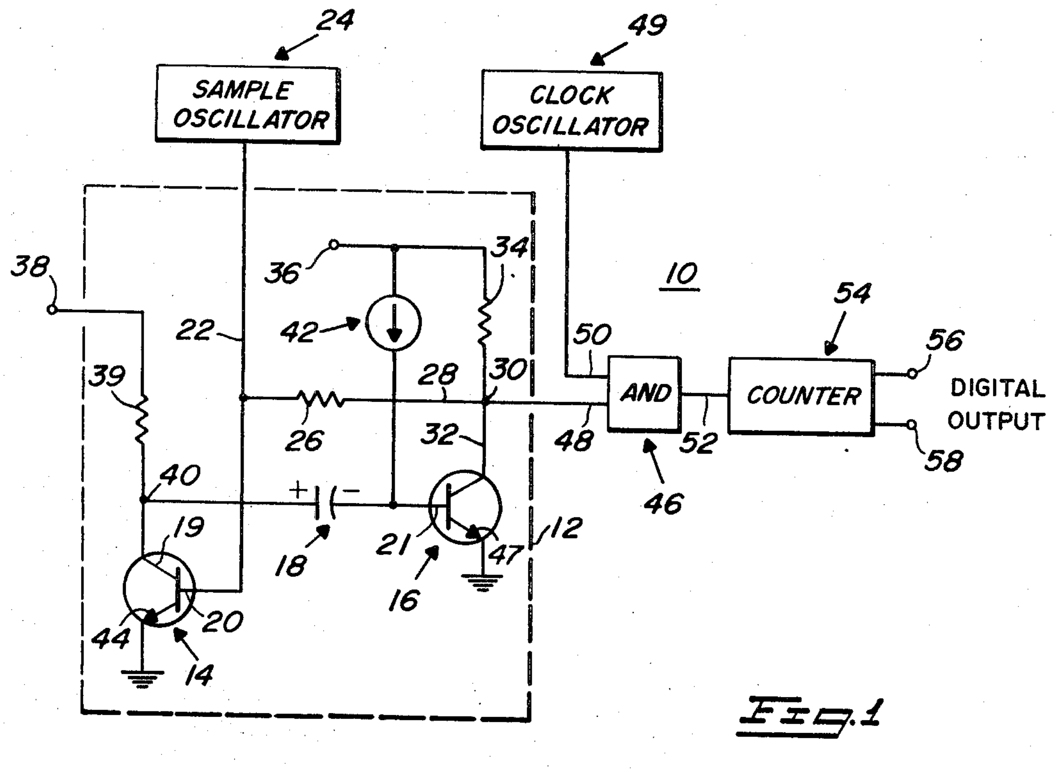
FIG. 1 is a schematic representation of an analog to digital converter circuit employing an analog to pulse width converter according to the invention.

Referring now to the drawing in greater detail, FIG. 1 thereof illustrates a preferred embodiment of the analog to digital converter circuit 10 including analog to pulse width converter circuitry 12, outlined in dotted lines, according to the invention.

The analog to pulse width converter circuitry 12 includes a monostable multivibrator having a pair of transistors 14, 16 and a capacitor 18 connected between the collector 19 of transistor 14 and the base 21 of transistor 16 in the conventional manner. The transistors 14, 16 are shown for illustrative purposes to be of the NPN type. Transistors of opposite conductivity type may also be used according to the invention, providing that sources of energization have their polarity reversed. The base 20 of transistor 14 is connected via lead 22 to a sample oscillator 24 which will be described in greater detail hereinafter. The base 20 is also connected via resistor 26 and lead 28 to junction 30 whereat the collector 32 of transistor 16 and a resistor 34 connected to the output 36 of a reference voltage power supply (not shown) are likewise connected. The output of the analog to pulse width converter circuitry is provided at junction 30 whereat additional circuitry also to be described hereinafter is connected.

The analog input of the circuit 12 is applied at point 38. The input voltage, as will be described hereinafter is representative of the value or level of a varying quantity, such as, for example, the oil pressure of an internal combustion engine of a motor vehicle. Point 38 is connected to junction 40 through a resistor 39 whereat the collector 19 of transistor 14 and the capacitor 18 coupled to base 21 of transistor 16 are likewise connected.

A highly stable constant current source 42 powered by the power supply voltage provided at 36, is connected to base 21 of transistor 16, and the emitters 44, 47 of transistors 14, 16, respectively, are connected to ground potential.

As mentioned heretofore, additional circuitry is added to the analog to pulse width converter circuit 12 to form the analog to digital converter circuit 10. In the embodiment illustrated in the drawing, AND gate 46 is connected at a first input 48 thereof to the output 30 of the analog to pulse width converter circuit 12 and the second input 50 of the AND gate is connected to a clock oscillator 49 which provides a predetermined number of pulses over a given time period. The output 52 of the AND gate is connected to a counter 54 which provides a digital output at output leads 56, 58 whereat a visual display device (not shown) may be connected.

The operation of the analog to pulse width converter circuit 12 is as follows.

An analog voltage, which is proportional to the level or value of a predetermined quantity, such as, for example, the oil pressure of an internal combustion engine of a motor vehicle, is applied at input 38. The input voltage serves to charge capacitor 18 in a first polarity or direction (See FIG. 1). The monostable multivibrator is normally in a quiescent state with transistor 16 being in the on condition and transistor 14 being held off; the constant current source 42 maintaining the multivibrator as described.

When the capacitor 18 is charged as shown in the drawing, a positive trigger pulse (see graph A of FIG. 2) is provided by the sample oscillator 24, which is set to supply such pulses at predetermined time intervals. The time intervals are each equal to a time greater than the maximum expected output pulse duration of the circuit 12 plus the time required to charge the capacitor 18 by means of said analog voltage.

The trigger pulse provides an input to the base 20 of transistor 14 to turn the latter transistor on. When this occurs, transistor 16 is turned off since the collector 19 of transistor 14 (junction 40) becomes zero (see graph B, FIG. 2). The base 21 of transistor 16 thus goes negative because of the charge on capacitor 18 and shuts off (see graph C, FIG. 2). The voltage at the output 30 or collector 32 of transistor 16 increases to a predetermined voltage level; i.e. the level of the reference voltage provided by the power supply connected at junction 36 (see graph D, FIG. 2). At this time, the constant current source 42 begins charging capacitor 18 in a direction opposite from that shown in the drawing in FIG. 1. Thus, the voltage at the base 21 of transistor 16 begins to rise (see graph C, FIG. 2). During the charging of capacitor 18 as last described, the output voltage at junction 30 remains the same. When capacitor 18 has been charged completely, a positive bias voltage from the capacitor is applied at the base of transistor 16 to turn the transistor on.

Figure 2:
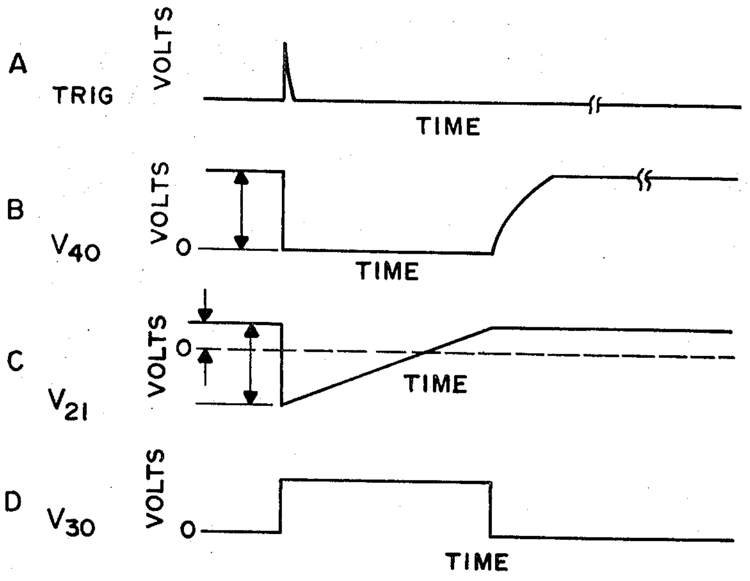
FIG. 2 is a graphical representation of the operation of the analog to pulse width converter circuit of FIG. 1.

The output at junction 30 goes to zero volts (see graph D, FIG. 2). This potential is applied at the base of transistor 14 to turn the latter off. Thereafter, capacitor 18 begins charging in the direction shown in the drawing by application of the analog voltage at input 38, thus raising the voltage at junction 40 gradually as indicated by the curved portion of graph B shown in FIG. 2. The cycle is then repeated upon receiving another trigger pulse from the sample oscillator.

It can be seen from the graphical representation of the operation of the analog to pulse width converter circuit 12 of the invention, that the duration of the output pulse at output point 30 of the circuit is directly proportional to the level of the analog input voltage applied at input 38 at the time a trigger pulse is provided by the sample oscillator. The level of the analog pulse determines the charge on the capacitor in the first direction shown in the drawing and thus the time required to charge the capacitor in a reverse polarity by the constant current source 42. The second charging time thus maintains the voltage provided by the power supply at output 30 thereat for the duration of the reverse polarity charging time of the capacitor.

Additional circuitry including the AND gate 46, clock oscillator 49 and counter 54 are provided to translate the output pulse width into a digital output. The operation of the digital portion of the circuit is as follows.

The clock oscillator 49 is set to provide a predetermined number of pulses for a given time period and operates continually. The AND gate, however, provides an output at lead 52 only upon receipt of a signal at both inputs 48 and 50. Thus, upon application of a voltage at point 30 of the analog to pulse width converter circuit there is provided at output 52 of the AND gate a series of pulses provided by the clock oscillator. The output pulses at lead 52 continues so long as an output voltage is applied at input 48 of the AND gate by the circuit 12.

The duration of the application of a signal at input 48, as seen heretofore, is determined by the level of voltage applied at input 38. The counter 54 counts the number of output pulses at the output lead 52 of AND gate 46, and provides an output at leads 56, 58, indicating the number of pulses counted. A display device may be connected at leads 56, 58 to indicate visually the number of pulses counted by counter 54. Choosing the clock oscillator and other components of the circuit properly will provide a digital output at leads 56, 58 representative of the level or value of the unknown quantity being measured. The selection of the values of components, etc., will be readily apparent to one skilled in the art and as such no specific examples will be given herein.

The analog to pulse width converter circuit of the instant invention thus provides an accurate means for supplying an output signal, the duration of which is proportional to the level of a signal applied at the input and which is representative of the value or level of an unknown quantity.

The circuit according to the invention is highly stable and accurate in operation. It is not subject to operating variations due to fluctuations in the power supply providing power thereto. The latter is avoided by employing the analog voltage itelf, which is derived directly as a result of the level or value of the unknown quantity being monitored and is independent of the power supply voltage of the circuit, for charging capacitor 18 in a first direction, and the constant current source, which is substantially unvarying regardless of the fluctuation in power supply voltage, for charging the capacitor in a reverse direction.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. An analog to pulse width converter circuit including in combination a monostable multivibrator having a first, quiescent state and a second, active state, including first and second transistor means, each having a common, input and output electrode and a charging capacitor coupled between the output electrode of said first transistor means and the input electrode of said second transistor means, constant current source means coupled electrically to the junction of said capacitor and the input electrode of said second transistor means, a circuit input coupled to the junction of the capacitor and output electrode of said first transistor means for applying an analog voltage to said multivibrator circuit, said analog voltage charging said capacitor in a first direction to a voltage potential determined by said analog voltage, and trigger circuit means, coupled electrically to said multivibrator, said trigger circuit means providing a trigger pulse for operation of said multivibrator from said first, quiescent to said second, active state to produce an output therefrom, said constant current source charging said capacitor in a direction opposite from said first direction upon application of said trigger pulse, the charging time of said capacitor in said second direction being determined by the voltage potential of said charge on said capacitor produced by said analog voltage, said circuit output being provided for a time period equal to that required to charge said capacitor by said constant current source in said second direction.

2. An analog to pulse width converter as claimed in claim 1 wherein said circuit trigger means includes an oscillator connected electrically to the input electrode of said first transistor means for the application of trigger pulses thereto, said trigger pulses being provided at predetermined time intervals equal to a time period greater than the maximum expected output pulse duration of said circuit plus the time required to charge said capacitor in said first direction.

3. An analog to pulse width converter circuit as claimed in claim 2 wherein said first and second transistor means include first and second transistors, respectively, each said transistor having a collector, base and emitter electrode corresponding to said common, input and output electrode, respectively, and wherein the input of said circuit is coupled to the collector electrode of said first transistor and the output of said circuit is coupled to the collector of said second transistor.

4. In an analog to digital converter including an AND gate having a pair of input electrodes and an output electrode, a clock circuit connected to provide predeterminedly time pulses to a first one of said input electrodes of said AND gate and pulse counter means having an input and output, said input being coupled electrically to the output electrode of said AND gate for counting pulses received therefrom and said output being connectible to digital display means for displaying the number of pulses counted thereby, an analog to pulse width converter circuit, said last-mentioned circuit including in combination: a monostable multivibrator having an input and an output and being operable to a first, stable and second, unstable state, said multivibrator including first and second transistors each having a base, collector and emitter electrode and a capacitor coupled electrically between the collector of said first transistor and the base of said second transistor, said multivibrator input coupled to the junction of said capacitor and the collector of said first transistor, and said multivibrator output being coupled electrically to the collector of said second transistor, constant current source means coupled electrically to the junction of said capacitor and the base electrode of said second transistor, said capacitor being charged in a first direction to a voltage potential determined by an analog voltage applied to said multivibrator input and trigger circuit means coupled electrically to said multivibrator providing a trigger pulse for operation of said multivibrator from said first, stable to said second, unstable state to produce a resulting voltage potential at the output thereof, said constant current source charging said capacitor in a direction opposite from said first direction upon operation of said multivibrator to said second, unstable state, the charging time of said capacitor in said second direction being determined by the voltage potential of the charge on said capacitor produced by said analog voltage, said circuit output being provided to the second one of said inputs of said AND gate for a time period equal to that required to charge said capacitor by said constant current source, said AND gate providing output pulses to said pulse counter means equal in number to the clock pulses provided by said clock circuit means, so long as said output is produced by said analog to pulse width converter circuit, the number of pulses counted by said pulse counter means corresponding to the voltage potential of said analog voltage applied to the input of said analog to pulse width converter circuit.

5. An analog to pulse width converter circuit as claimed in claim 4 wherein said trigger circuit means is connected electrically to the base electrode of said first transistor for application of said trigger pulse thereto, said trigger circuit including circuitry for applying pulses at predetermined time intervals equal to a time period greater than the maximum expected output pulse duration of said analog to pulse width converter circuit plus the time required to charge said capacitor in said first direction.

* * * * *